Oct. 31, 1961 W. B. GILES 3,006,371
LOW GAIN AND LONG TRAVEL VALVE
Filed June 19, 1956
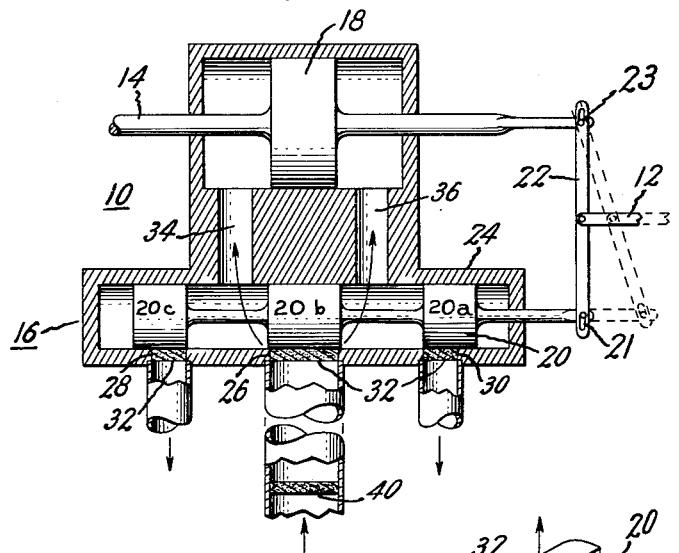
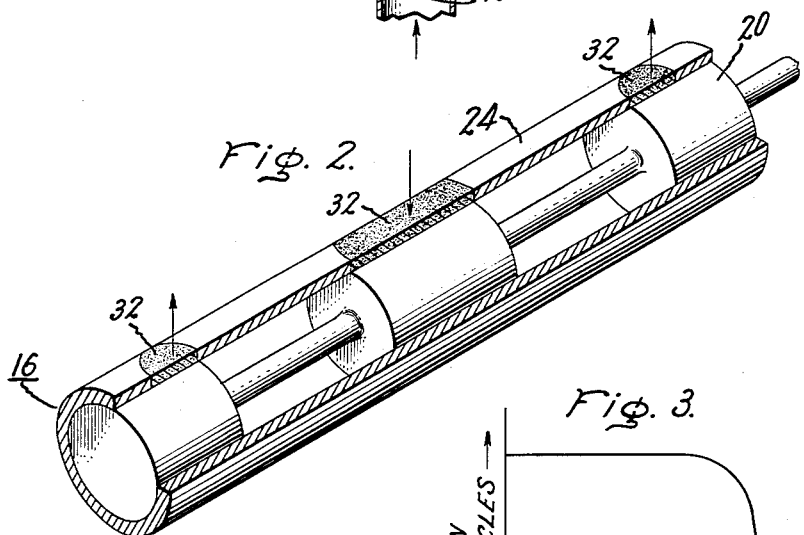
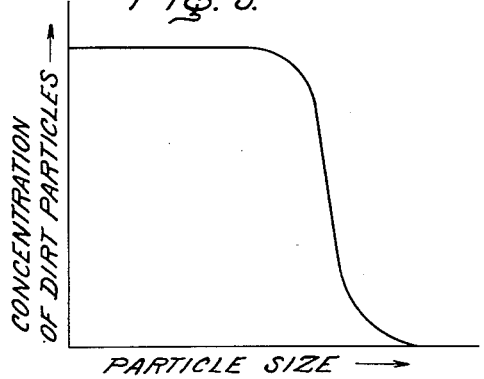
Inventor:
Walter B. Giles,
by Roe D. McBurnett
His Attorney.

United States Patent Office 3,006,371
Patented Oct. 31, 1961

3,006,371
LOW GAIN AND LONG TRAVEL VALVE
Walter B. Giles, Schenectady, N.Y., assignor to General Electric Company, a corporation of New York
Filed June 19, 1956, Ser. No. 592,279
3 Claims. (Cl. 137—622)

The present invention relates to a low flow gradient valve and more particularly to a valve having a low flow change therethrough for a long valve stem displacement while still maintaining a high pressure gradient.

In various hydraulic systems, it is desirable to convert a long stroke mechanical input into a hydraulic output of a small flow change. A low flow gradient valve is most desirable for this type of application since the valve stem may be connected directly to a long stroke mechanical input without the intermediate need of such mechanisms as cams, levers, or other motion reducing linkage. Presently, an open centered valve such as a flapper valve may be used to obtain the desired low flow gradient; however, such valves have the inherent disadvantage of having a low pressure gradient, a low pressure change for a given movement of the valve piston, which tends to establish a dead response period or deadband in the system. This disadvantage cannot be tolerated in hydraulic systems wherein response of the output member to the input should be at a constant predetermined rate.

Another method of obtaining a low flow gradient valve in such hydraulic systems as stabilization networks used in jet engine instrumentation to control the actuation of flaps and other control surfaces is the application of bulky, large diameter, and rather expensive servo pistons responding to pilot input. These large servo pistons are extremely undesirable in present high speed aircraft where weight and available space is of prime importance, and prudent saving of weight and space can make the difference between a successful or unsuccessful aircraft. Also, a low supply pressure may be utilized to achieve a low flow gradient but this has the disadvantage that low forces are then available at the output.

The present invention provides a hydraulic valve with a low flow change for a given long travel of the valve stem without an increase in size, weight, or expense so common with conventional valves attempting to achieve similar results. As is well known, the gain of a hydraulic valve characterizes the volume of flow per unit stem displacement, and its magnitude is dependent on the port width and pressure drop across the valve ports. Thus, a low valve gain analogous to a low flow gradient valve is obtained by the insertion of a porous material, such as sintered bronze or the like, into the valve ports to drastically reduce the effective port area and width while still maintaining a high pressure gradient. The valve ports are not susceptible to stilting in dirty fluid operation since they're preceded by a filter of porous material incorporated in the fluid supply line leading to the valve. The filter will only pass through dirt particles below a given size which will readily pass through the sintered port material without clogging or changing their flow characteristics.

An object of the present invention is the provision of a valve with a small flow change for a given movement of the valve stem.

Another object is the provision of a non-silting valve converting a long stroke mechanical input into a hydraulic output of small flow change while maintaining a high pressure gradient.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIGURE 1 is a cross-sectional view of a preferred embodiment of the invention;

FIGURE 2 is a perspective view of the valve sleeve and stem member showing the porous material inserts within the ports; and FIGURE 3 is a plot of the filtering action of a typical sintered material illustrating the sharp cut-off of dirt concentration of particles passed by filter versus particle size.

Referring now to the drawing, there is illustrated a preferred embodiment comprising a servomechanism system 10 reacting to a mechanical input at 12 for actuating a load at 14 through a valve 16 controller the flow of fluid to a servo piston 18. The input lever 12 is pivotally mounted to the center of a cross link 22 extendibly and pivotally connected to valve stem 20 at 21 and to the servo piston 18 at 23. The valve stem 20 is provided with a plurality of lands 20a, 20b and 20c slidably coacting with a sleeve portion 24 of the valve 16.

The valve sleeve 24 is provided with a port 26 connected through conventional tubing, for example, to a suitable constant pressure supply source, such as a pump with a conventional pressure regulator (not shown). Drain ports 28 and 30 are provided on opposite sides of the port 26 in the valve sleeve 24, and are connected to a drain reservoir (not shown). The port members 26, 28, and 30, which may be of any shape or configuration, are herein formed as round apertures in the sleeve member 24 and provided with porous inserts 32 of such material as sintered bronze or the like. The porous inserts 32 may be shrunk fit into their respective ports and then the bore of the sleeve 24 finished ground to provide the internal surface of the porous material with a curvature equivalent to that of the bore. The utilization of sintered materials, such as used for filters, for the members 32 are practical due to the inherent sharp particle cut-off characteristics when passing fluid therethrough, as hereinafter discussed.

The valve 16 is operatively connected through connecting ports 34 or 36 to the servo piston 18 so that suitable actuation of the valve piston 20 will cover or uncover ports 26, 28 and 30 to control the flow of fluid from the supply port 26 through either port 34 or 36 to actuate the servo piston in a predetermined amount and direction. In FIGURE 2, the valve sleeve 24, exaggerated for purposes of illustration, is shown with the sintered material inserts 32 fitted within the ports 26, 28, and 30 so as to attain the desired low flow gradient therethrough.

The size of the port 26 and the porosity of the sintered bronze insert 32 are selected so that with a given pressure of the hydraulic fluid a low valve gain is obtained while still maintaining a high pressure gradient. Also the relationship between the valve land 20b and the port 26 is selected so that there can be a long travel of the valve stem 20 with the port 26 being maintained open. Thus with a sintered metal insert 32 of a porosity which restricts flow of hydraulic fluid through the port 26, arranged as described herein, a low gain, long travel valve is obtained.

FIGURE 3 shows a plot of the filtering action of a sintered material such as sintered bronze indicating the concentration of dirt particles versus particle size. It can be seen that by inserting a filter with the illustrated characteristics of a very sharp cut-off of dirt particles in the supply line leading to the supply port 26, only dirt particles below a predetermined size will be passed. Thus, if the sintered inserts 32 inserted in the various ports are made of a coarser aggregate than a supply filter 40, all the dirt particles will be passed without clogging the sintered inserts and will not change the fluid flow therethrough.

Accordingly, a low gain and long travel valve is obtained wherein the mechanical input at the member 12 is used to directly position the valve stem 20 without the intermediate need of other mechanism. Thus, more design flexibility is available in matching the mechanical input motion to valve gain, and the necessity for lost motion devices and high manufacturing accuracy required in valve port construction is substantially eliminated.

In operation, a displacement of the input lever 12 in either direction will cause the valve stem 20 to move in the direction of the displacement and thereby cause the hydraulic fluid to flow from port 26 through either connecting port 34 or 36 to actuate or displace the servo piston 18 in the desired direction. The cross link 22 in the dotted form represents a displacement of the input lever to the right and indicates a corresponding displacement in a similar direction of the valve stem 20. The cross link 22 upon movement of the input lever 12 will first pivot about the point 23 since the servo piston 18 will not be displaced by any movement of the lever 12 due to fluid stability on either side of the servo piston.

With the cross link 22 in the dotted position, the fluid will flow from the constant pressure supply through the filter 40, port 26, and insert 32 and to the left side of the servo piston 18 to displace the piston to the right and pivot the cross link 22 about the lever 12 to displace the valve stem 20 so that the valve land 20b covers the port 26 to stop the flow of fluid therethrough. Movement of the valve stem 20 to the right also causes movement of the land 20a to uncover port 30 and permit exhaust flow of fluid from the right hand portion of the valve 16. The hydraulic system of FIGURE 1, therefore, illustrates a hydraulic system serving as the environment for the present utilization of a sintered material in valve ports to obtain a low gain and long travel valve.

In summary, the present invention involves the insertion of a porous material insert 32 in the port openings of a valve sleeve so as to obtain a low valve gain. A low gain valve is achieved without the occurrence of a low pressure gradient, high standby leakage, or deadband so common in present types of valve structure. In applications where low gain and long travel valves are desirable, the present invention makes possible the utilization of mechanical inputs to directly position the valve, as shown in the preferred embodiment. Accordingly, more design flexibility is available in matching mechanical motion to valve gain, and the necessity for expensive lost motion devices and high accuracy in the manufacturing of valve ports is substantially minimized.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A low gain, long travel valve unit having a sleeve member, drain ports provided on said sleeve member, a supply port on said sleeve member, porous means within each of said drain and supply ports, means coupling said supply port to a source of fluid, filter means between said source of fluid and said supply port to prevent clogging of said supply port, and stem means reciprocating within said sleeve member and cooperating with said porous means to obtain a low flow through said various ports for a long movement of the stem means.

2. A hydraulic valve system comprising, a valve sleeve having a plurality of port means thereon, a reciprocating stem member within said sleeve and cooperating with said ports to control the direction of fluid therethrough, porous means mounted within each of said port means to control the amount of fluid flow therethrough to a predetermined value, means coupling one of said port means to a fluid supply, filter means having a finer aggregate than the aggregate of the porous material within each of said port means located between said fluid supply and the port coupled thereto.

3. A hydraulic valve adapted to provide a low flow change therethrough for a long valve stem movement while maintaining a predetermined high pressure gradient comprising a sleeve member, drain ports provided in said sleeve member, a supply port in said sleeve member, porous inserts mounted within each of said drain and supply ports for restricting the amount of fluid flow through the ports to a predetermined value, means for coupling said supply port to a source of hydraulic fluid, a filter in said coupling means between said source and said supply port to prevent clogging of said supply port, said filter having a finer aggregate than the aggregate of said porous inserts, a reciprocable valve stem member within said sleeve adapted upon reciprocation to cooperate with said ports to control the direction of flow therethrough, the relationship between the size of said ports and the porosity of the porous inserts being such, for a given fluid pressure, that a low flow change is obtained for a long movement of said valve stem.

References Cited in the file of this patent

UNITED STATES PATENTS

| | | |
|---|---|---|
| 2,396,643 | De Ganahl | Mar. 19, 1946 |
| 2,517,061 | Von Stackelberg | Aug. 1, 1950 |
| 2,612,872 | Strayer | Oct. 7, 1952 |
| 2,655,904 | Strayer | Oct. 20, 1953 |
| 2,706,467 | Houldsworth | Apr. 19, 1955 |